Patented Nov. 20, 1923.

1,474,479

UNITED STATES PATENT OFFICE.

BERNARD HOWARD JACOBSON, OF CHARLESTON, WEST VIRGINIA, ASSIGNOR TO E. C. KLIPSTEIN & SONS COMPANY, OF NEW YORK, N. Y., A CORPORATION OF NEW JERSEY.

MANUFACTURE OF METAL CHLORIDES.

No Drawing.  Application filed May 31, 1922. Serial No. 564,972.

*To all whom it may concern:*

Be it known that I, BERNARD HOWARD JACOBSON, a citizen of the United States, residing at Charleston, county of Kanawha, State of West Virginia, have invented certain new and useful Improvements in the Manufacture of Metal Chlorides; and I do hereby declare the following to be a full, clear, and exact description of the invention, such as will enable others skilled in the art to which it appertains to make and use the same.

This invention relates to manufacture of metal chlorides; and it relates more particularly to the manufacture of anhydrous metal chlorides, especially aluminum chloride, by a process in which the metal whose chloride is desired is acted upon by chlorine through the intermediacy or assistance of bromine that is present in reactive or available condition in the reaction zone, whereby the metal chloride is produced in a systematic and economical manner, the reaction mixture also comprising an agent that enables the operating temperature to be kept below the liquefying temperature of the metal chloride in question without solidification of the reaction mass and without the use of superatmospheric pressure.

In my prior copending application, Serial No. 476,633, filed June 10th, 1921 (Patent No. 1,445,082, February 13, 1923), I have described a process of making anhydrous aluminum chloride, which method, broadly speaking, is applicable to the manufacture of metal chlorides generally, with few exceptions. According to said method, bromine in readily available form is caused to react upon metallic aluminum to form the bromid, which in turn is acted upon by free chlorine to form aluminum chloride with regeneration of bromine, the regenerated bromine immediately combining with more aluminum and thus functioning over and over again in the process. The present invention involves the same general principles of operation but includes certain refinements and improvements which are of great importance and utility in carrying out the process commercially. The present application is therefore in effect a continuation in part of my prior copending application aforesaid.

While the present process is applicable for the production of metal chlorides generally, reference will be made hereinafter more particularly to the manufacture of aluminum chloride as a specific example illustrating an embodiment of the principles of the invention in especially important and desirable form. Aluminum chloride is a solid which sublimes at about 183° C., at which temperature a pressure of say 40 pounds per square inch is required to liquefy the sublimate. Therefore, in any process in which aluminum chloride is formed in substantially pure condition and under normal atmospheric pressure below 183° C., it is formed as a solid which soon cakes up or clogs the reaction vessel. Although the process of my prior application aforesaid works well in practice, it has been found highly desirable to devise some way of operating at lower temperatures in order to avoid excessive corrosion of the reaction vessel employed, without at the same time causing clogging of the apparatus through solidification of the reaction product and without complicating the technique by using superatmospheric pressure to maintain the reaction mass fluid. I have found that this can be achieved by ensuring the presence in the reaction mass of a suitable proportion of an agent, specifically a salt, which reduces the melting or liquefying point of the aluminum chloride and forms therewith a mixture which remains fluid at temperatures optionally as low as 125° C. in practice. The type of agent most desirable to use for this purpose is a salt that is inert toward the aluminum chloride, or practically so, and that is unobjectionable in mixture therewith. Sodium chloride is a typical salt that can be satisfactorily employed for the purpose stated, and other salts that can be used partly or wholly in place thereof are, for example, sodium bromid, potassium chloride or potassium bromid.

The addition to aluminum chloride of about 5 per cent by weight of sodium chloride gives a mixture that can be melted at about 150° C. at normal atmospheric pressure; while an addition of 15 to 30 per cent by weight of sodium chloride gives a good liquid melt at 125° C. under normal pressure. In addition to its desirable characteristic of fusing to give a good liquid melt at the relatively low temperatures mentioned, instead of solidifying at much higher temperatures as does pure aluminum chloride, there is the further advantage that the liquid melt has the property of readily dissolving small percentages of bromine, a characteristic that renders it particularly advantageous and desirable in practicing my process.

In order to more fully explain the underlying principles of the invention, a specific example of one way in which the invention can be carried out in practice will now be given. Into a covered iron pot or rotating mill of suitable size, say 30 gallons, is charged about 200 pounds of previously prepared aluminum chloride and about 30 pounds of common slat (sodium chloride). The salt should also be anhydrous for best results, but commercial salt will do. Instead of charging the aluminum chloride and common salt separately as such into the iron pot, it is of course feasible to use the proper quantity of a mixture of aluminum chloride and sodium chloride, such as that obtained as a final product in the present process. The iron pot is then heated to from 125° C. to 150° C. to liquefy the charge, after which is added about 15 pounds of metallic aluminum, preferably in small pieces, and then about 3 pounds of bromine. The bromine immediately reacts with a part of the metallic aluminum to form aluminum bromid. Chlorine gas is now introduced below the surface of the liquid melt in the pot by introducing it through a pipe dipping down through the liquid melt to near the bottom of the reaction vessel so that the gas bubbles up through the liquid mass. The chlorine so introduced at once reacts with the aluminum bromid present in the melt, forming aluminum chloride and liberating the bromine according to the following reaction:

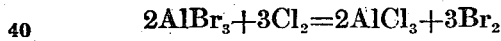

The bromine at once reacts with more metallic aluminum to form more aluminum bromid which in turn is at once converted by the available free chlorine into aluminum chloride with regeneration of bromine, the process being thus cyclical and continuous in character. At suitable intervals a portion of the melt is drawn off and allowed to solidify; and fresh portions of metallic aluminum and common salt are added from time to time as may be required to maintain the proper progress of the reaction and the necessary volume and fluidity of the reaction mass. It is good practice to add about one-half pound of sodium chloride with each pound of metallic aluminum in thus maintaining the progress of the reaction. The temperature is most desirably held between 125° and 150° C., the heat of reaction between the metal, bromine and chlorine being sufficient to accomplish this without external heating after the reaction is proceeding normally. In general, the temperature should be kept relatively low since this favors minimum corrosion of the reaction vessel. A small amount of bromine should also be added from time to time to make up for unavoidable loss which occurs notwithstanding the fact that theoretically all the bromine is returned to the process. In practice it is found desirable to add about one or two pounds of bromine to the reaction vessel for every 100 pounds of the aluminum chloride and common salt mixture withdrawn therefrom.

In another way of conducting the operation it is feasible to maintain the reaction temperature at about 200° C., and by attaching a condenser to volatilize the aluminum chloride continuously as it is formed and recover it (mixed with some sodium chloride) by condensation, while at the same time maintaining a nearly constant melt or reaction mass in the reaction vessel. This is due to the fact that the mixture of salt and aluminum chloride, or sodium aluminum chloride, is not nearly as volatile as aluminum chloride alone. This particular mode of operation yields a product that is much higher in aluminum chloride content than where the portions of the melt are directly withdrawn from time to time from the reactor.

It is not essential for successful operation that the liquid melt or reaction mass in the reactor be the theoretical double chloride of aluminum and sodium which is composed of about 30 per cent of salt. In fact 10 to 15 per cent of sodium chloride in the reaction mass allows good operation at relatively low temperature. The resulting product consists principally of aluminum chloride and common salt. It is easily ground to a fine powder, and is anhydrous. Moreover, it does not fume nearly as much as pure aluminum chloride, nor is it nearly as hygroscopic. The presence of the salt does not interfere with the normal action of the aluminum chloride in organic synthesis, especially in the Friedel-Crafts reaction.

By using sodium bromid in place of sodium chloride, it is not necessary to add bromine as such, since the introduction of free chlorine decomposes the sodium bromid to give free bromine and sodium chloride. Furthermore, as previously stated, salts other than sodium chloride can be used to give a mixture that can be maintained liquid at the relatively low temperatures in question.

The described method evidently provides a simple and relatively cheap process whereby anhydrous aluminum chloride can be manufactured at comparatively low temperatures and at ordinary pressure.

What I claim is:

1. The process of manufacturing an anhydrous metal chloride which comprises subjecting the metal whose chloride is desired to the action of chlorine through the intermediacy of bromine under reacting conditions and in the presence of an agent that is effective to maintain the reaction mass fluid under normal atmospheric pressure at a temperature below the melting point of the pure chloride.

2. The process of manufacturing an anhydrous metal chloride which comprises converting into bromid at least a portion of the metal whose chloride is desired, and decomposing the bromid with chlorine to form the chloride, the chlorine decomposition reaction mass including a salt which, in association with said chloride, gives a mixture that is liquefiable by heat at a temperature below the liquefying temperature of the pure chloride.

3. The process of manufacturing an anhydrous metal chloride which comprises converting into bromid at least a portion of the metal whose chloride is desired, and decomposing the bromid with chlorine to form the chloride, the chlorine decomposition reaction mass including sodium chloride in sufficient proportion to render said mass liquefiable by heat at a temperature below the liquefying temperature of the pure chloride.

4. The process of manufacuring anhydrous aluminum chloride which comprises subjecting metallic aluminum to the action of chlorine through the intermediacy of bromine under reacting conditions and in the presence of an agent that is effective to maintain the reaction mass fluid under normal atmospheric pressure at a temperature below the melting point of pure aluminum chloride.

5. The process of manufacturing anhydrous aluminum chloride which comprises maintaining a mixture of aluminum chloride and a salt substantially inert with respect thereto fluid at a temperature below the melting point of aluminum chloride under the pressure prevailing, and charging metallic aluminum, bromine and chlorine into the fluid mass.

6. The process of manufacturing anhydrous aluminum chloride which comprises preparing a molten mixture of aluminum chloride and sodium chloride, the proportion of sodium chloride being from about 5 to about 30 per cent of the weight of aluminum chloride, adding metallic aluminum and a relatively small proportion of bromine to the melt, and passing chlorine into the melt while the said melt is maintained at temperature lying within the approximate limits of 125° to 150° C., withdrawing portions of the melt, and adding more metallic aluminum and sodium chloride thereto.

7. The process of manufacturing anhydrous aluminum chloride which comprises providing a melt comprising aluminum chloride and an alkali-metal salt, adding metallic aluminum thereto, and passing chlorine into the melt, bromine being present in said melt in available form.

8. The process of manufacturing anhydrous sodium aluminum chloride which comprises preparing a molten mixture of aluminum chloride and an alkali metal salt, adding metallic aluminum and bromine to the melt and passing chlorine thereinto while the melt is maintained at a temperature high enough to ensure effective chloridizing action.

9. The process of manufacturing amhydrous aluminum chloride which comprises continuously passing chlorine into contact with metallic aluminum in the presence of bromine available in reactive form, removing aluminum chloride from the reaction zone as the reaction progresses, and introducing more metallic aluminum thereinto.

10. The process of manufacturing anhydrous aluminum chloride which comprises establishing a fluid reaction mass comprising molten aluminum chloride, metallic aluminum and available bromine, introducing chlorine into said mass substantially continuously, removing aluminum chloride therefrom as the reaction progress, and adding metallic aluminum to said mass as required to maintain said reaction.

In testimony whereof I hereunto affix my signature.

BERNARD HOWARD JACOBSON.